US012712480B1

(12) United States Patent
Perritt, Jr.

(10) Patent No.: US 12,712,480 B1
(45) Date of Patent: Aug. 18, 2026

(54) SOLAR HYDROGEN FUEL CELL SYSTEM

(71) Applicant: Henry Hardy Perritt, Jr., Charlottesville, VA (US)

(72) Inventor: Henry Hardy Perritt, Jr., Charlottesville, VA (US)

( * ) Notice: Subject to any disclaimer, the term of this patent is extended or adjusted under 35 U.S.C. 154(b) by 0 days.

(21) Appl. No.: 19/428,212

(22) Filed: Dec. 21, 2025

(51) Int. Cl.
*H02S 10/20* (2014.01)
*H01M 4/86* (2006.01)
*H01M 4/90* (2006.01)
*H01M 8/04007* (2016.01)
*H01M 8/1253* (2016.01)
(Continued)

(52) U.S. Cl.
CPC ............ *H02S 10/20* (2014.12); *H01M 4/861* (2013.01); *H01M 4/9025* (2013.01); *H01M 8/04052* (2013.01); *H01M 8/04074* (2013.01); *H01M 8/1253* (2013.01); *H01M 8/186* (2013.01); *H02J 3/003* (2020.01); *H02J 3/28* (2013.01); *H02J 3/381* (2013.01); *H01M 2008/1293* (2013.01); *H02J 2101/24* (2026.01);
(Continued)

(58) Field of Classification Search
CPC ..... H02S 10/20; H01M 4/861; H01M 4/9025; H01M 8/04052; H01M 8/04074; H01M 8/1253; H01M 8/186; H01M 2008/1293; H02J 3/0003; H02J 3/28; H02J 3/381; H02J 2101/24; H02J 2101/30; H02J 2103/30; H02J 2103/40
See application file for complete search history.

(56) References Cited

U.S. PATENT DOCUMENTS 8,586,253 B2 11/2013 Hibbs et al.
11,011,321 B2 5/2021 Zheng et al.
(Continued)

FOREIGN PATENT DOCUMENTS

CN 115084580 A * 9/2022 ................ H02J 3/32

OTHER PUBLICATIONS

Shao et al., Mult-mode energy management method of integrated photovoltaic energy storage system, May 22, 2023, International Conference Power Electronic-ECEE-Asia, p. 2706-2712. (Year: 2023).*

*Primary Examiner* — Kidest Worku
(74) *Attorney, Agent, or Firm* — Henry H. Perritt, Jr.

(57) ABSTRACT

An adaptive multi-mode solar energy storage system achieves unprecedented round-trip efficiency exceeding 50% through integration of reversible solid oxide cells (rSOC), predictive machine learning control, thermal recovery networks, and hybrid hydrogen storage. The system employs rSOC stacks with graded porosity electrodes and infiltrated nanocatalysts operating alternately in electrolysis and fuel cell modes. A predictive control system using LSTM neural networks forecasts conditions 72 hours ahead, selecting between five operational modes. Dynamic stack reconfiguration eliminates power electronics losses by matching solar voltage variations. Multi-stage near-isothermal compression with energy recovery feeds a hybrid storage system combining pressure vessels with metal organic frameworks. Comprehensive thermal integration captures high-grade heat in molten salt storage for thermally-assisted electrolysis. The system provides economically viable storage from hours to seasons, bridging the gap between batteries and conventional hydrogen storage.

14 Claims, 9 Drawing Sheets

(51) Int. Cl.

*H01M 8/18* (2006.01)
*H02J 3/00* (2006.01)
*H02J 3/28* (2026.01)
*H02J 3/38* (2006.01)
*H01M 8/12* (2016.01)
*H02J 101/24* (2026.01)
*H02J 101/30* (2026.01)
*H02J 103/30* (2026.01)
*H02J 103/40* (2026.01)

(52) U.S. Cl.

CPC ....... *H02J 2101/30* (2026.01); *H02J 2103/30* (2026.01); *H02J 2103/40* (2026.01)

(56) References Cited

U.S. PATENT DOCUMENTS

2009/0263681 A1* 10/2009 Atreya .............. H01M 8/04007 429/418
2010/0167147 A1 7/2010 Irvine et al.
2011/0142750 A1* 6/2011 Pulskamp ................ B01J 20/20 977/762
2011/0195327 A1 8/2011 Maass et al.
2012/0003552 A1* 1/2012 Barnett ................... C25B 15/02 429/408
2012/0299384 A1 11/2012 Peled et al.
2015/0176526 A1* 6/2015 Frazier .................... F02G 1/055 60/793
2016/0351916 A1* 12/2016 Birss ................... H01M 4/8825
2018/0115003 A1 4/2018 Reytier et al.
2019/0221883 A1 7/2019 Read et al.
2021/0050584 A1 2/2021 Brewer et al.
2021/0057733 A1 2/2021 Brewer et al.
2022/0109173 A1* 4/2022 Gomez ............... H01M 16/003
2022/0170388 A1* 6/2022 O'Donnell ................ F01K 3/02
2024/0088402 A1* 3/2024 Evans ................. H01M 4/9033

* cited by examiner

SOLAR HYDROGEN FUEL CELL SYSTEM

CROSS-REFERENCE TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

STATEMENT REGARDING PRIOR DISCLOSURES BY THE INVENTOR OR A JOINT INVENTOR

Not applicable

BACKGROUND

Background of the Invention

Field of the Invention

The present invention relates generally to renewable energy storage systems, and more particularly to an integrated solar energy storage system employing reversible solid oxide cells (rSOC) with predictive optimization control, thermal integration, and hybrid storage mechanisms for improved round-trip efficiency and economic operation.

Description of Related Art

Conventional renewable energy systems face the fundamental challenge of intermittency. While battery storage provides high round-trip efficiency (85-95%), it becomes economically prohibitive for long-duration storage exceeding 8-12 hours. Hydrogen storage offers long-duration capability but suffers from poor round-trip efficiency (25-35%) in conventional configurations.

The well-understood phenomenon of solar energy production uses large collections of photovoltaic semiconductor cells to generate electricity when the sun shines on the cells. The electricity output diminishes to zero when the sun is not shining. Because of this intermittent electricity generation, engineers have attempted various means for storing some of the electrical energy when the sun is shining so that it can be used to even out electricity production when the solar cells themselves are not generating.

Electricity can be stored in the form of hydrogen and oxygen through a process known as electrolysis when electrodes are immersed in water, and the current passes between them. The electrons from the electrical current cause the water to ionize, producing hydrogen atoms at the cathode and oxygen atoms at the anode. Appropriate capture and storage mechanisms can capture the hydrogen and oxygen atoms, emitted in gaseous form from the electrolysis and compress them into stored quantities available for later use.

Pure hydrogen and pure oxygen can be combined in fuel cells to generate electricity. An anode comprising an appropriate carrier such as highly porous carbon can be doped with nano-sized particles of a catalyst such as platinum. When the particles are small enough, they interact with hydrogen atoms to create positively charged ions called protons and to release electrons. If the anode is separated from a positively charged cathode by an appropriate membrane and if the cathode is fed pure oxygen, the positively charged protons, but not the electrons, pass through the membrane and combine with the oxygen items to form water. Current flows in the form of electrons passing between the anode and the cathode The hardware necessary for electrolysis is the same as that necessary for fuel cells, and so it is possible to design a system that performs electrolysis when being fed electricity from the solar cell array and to generate electricity as a fuel cell when the solar cell is not providing electricity.

Existing solar-to-hydrogen systems typically employ separate electrolyzers and fuel cells, resulting in capital redundancy and efficiency losses. Prior art systems operate in fixed modes without adaptive response to grid conditions, weather forecasts, or market signals. Furthermore, conventional systems fail to utilize waste heat effectively, particularly the high-grade heat from solid oxide cells.

Metal organic frameworks (MOFs) have been proposed for hydrogen storage but have not been effectively integrated into complete energy systems with thermal management. Similarly, machine learning has been applied to grid operations but not to the integrated control of reversible electrochemical systems with multiple storage modes.

An integrated system is needed that overcomes the efficiency limitations of hydrogen storage while maintaining its long-duration advantages, dynamically optimizes between operational modes, and provides economically viable energy storage across multiple timescales.

The thermodynamics of reversible solid oxide cells present unique thermal management challenges that prior art has failed to address adequately. During fuel cell operation, the electrochemical oxidation of hydrogen is highly exothermic, releasing approximately 48 kJ/mol of heat at typical operating temperatures of 750-850° C. This heat generation follows the relationship $\Delta H=-nFE+T\Delta S$, where the entropic contribution becomes significant at elevated temperatures. Conversely, electrolysis operation is strongly endothermic, requiring the same amount of heat input to sustain the water splitting reaction. Prior art systems typically dissipate the fuel cell heat as waste and rely on electrical resistance heating during electrolysis, resulting in substantial efficiency penalties.

The temporal mismatch between heat generation and consumption in reversible electrochemical systems has not been adequately addressed by existing technologies. Fuel cell operation typically occurs during periods of high electrical demand, often in the evening when solar resources are unavailable. The exothermic heat generated during these periods must be either utilized immediately or wasted. Subsequently, when excess solar energy drives electrolysis operation during daylight hours, the endothermic reaction requires heat input that conventional systems provide through inefficient electrical heating, consuming 15-20% of the input electricity. This thermal cycling between exothermic and endothermic modes occurs on diurnal timescales, yet prior art lacks effective thermal storage solutions matched to these operational patterns.

Conventional hydrogen systems waste the heat generated when making electricity (Fuel Cell mode) and then pay for electricity to create heat when making hydrogen (Electrolysis mode).

Reversible solid oxide cells (rSOC) present two fundamental problems: thermodynamic inefficiency and temporal mismatch, limiting such systems to the low round-trip efficiency (25-35%) typical of conventional hydrogen storage.

Molten salt thermal storage systems have been employed in concentrated solar power applications but have not been effectively integrated with reversible electrochemical cells. The temperature requirements present particular challenges: solid oxide cells operate optimally at 750-850° C., while common solar salts (60% $NaNO_3$/40% $KNO_3$) decompose above 600° C. unless used in controlled atmospheres. Higher temperature salts such as chloride mixtures can withstand solid oxide cell temperatures but present severe corrosion challenges. Furthermore, the heat transfer rates required for managing rapid transitions between exothermic and endothermic operation exceed the capabilities of conventional molten salt heat exchangers designed for steady-state solar thermal applications.

The efficiency impact of inadequate thermal integration in reversible solid oxide systems is substantial but underappreciated. During electrolysis, the electrical energy requirement can be reduced from 3.2 V to 2.6 V per cell when operated thermally neutral (where electrical energy equals the Gibbs free energy change and thermal energy provides the entropic contribution). This represents a theoretical efficiency improvement from 77% to 95% (HHV basis). Achieving thermal neutral operation, however, a requires precisely managing heat flows of 200-300 kW per megawatt of hydrogen production. Prior art systems fail to capture and store the equivalent heat generated during fuel cell operation, missing the opportunity for this efficiency gain.

Existing electrochemical systems also fail to account for the grade-specific heat requirements across different temperature ranges. High-grade heat (750-850° C.) from fuel cell operation is particularly valuable for driving endothermic electrolysis, yet most is degraded through cooling systems. Medium-grade heat (200-400° C.) from compression processes and power electronics could preheat reactant streams but is typically dissipated. Low-grade heat (<100° C.) from auxiliary systems represents additional losses. The prior art lacks comprehensive thermal integration architectures that cascade heat utilization across these temperature ranges while accommodating the cyclic nature of reversible operation.

The dynamic thermal requirements of reversible solid oxide cells during mode transitions represent an additional challenge unaddressed by conventional designs. Transitioning from fuel cell to electrolysis mode requires careful thermal management to prevent thermal shock while maintaining stack temperature within operational limits. The thermal mass of the stack creates lag times of 10-30 minutes for mode transitions without active thermal management. Prior art systems either accept these delays, reducing system responsiveness, or maintain stacks at temperature using parasitic electrical heating, reducing overall efficiency. No existing system provides rapid thermal compensation during mode transitions while maintaining high round-trip efficiency.

BRIEF SUMMARY

The present invention provides an adaptive multi-mode solar energy storage system that achieves superior round-trip efficiency through the integration of reversible solid oxide cells, predictive control algorithms, thermal recovery networks, and hybrid storage mechanisms.

By using high-temperature molten salt (chlorides) to store the 850° C. waste heat from the night-time fuel cell cycle and using it to heat the day-time electrolysis cycle, the system lowers the voltage required to split water from ~3.2V to ~2.6V. This "thermoneutral" operation is a proven phenomenon. By effectively storing the heat of fuel-cell operation, the efficiency jump to ~52% round-trip is physically possible.

In one aspect, the invention comprises photovoltaic arrays directly coupled to reversible solid oxide cell (rSOC) stacks that operate alternately in electrolysis mode (SOEC) and fuel cell mode (SOFC), eliminating redundant components while maintaining operational flexibility.

The system incorporates a predictive control system utilizing machine learning algorithms that forecast energy demand, weather patterns, and market conditions 72 hours in advance, dynamically selecting between five operational modes: (1) direct electrolysis, (2) thermally-assisted electrolysis, (3) fuel cell generation, (4) combined heat and power, and (5) bypass storage mode.

The heat storage system solves the two fundamental flaws of reversible solid oxide cells (rSOC): thermodynamic inefficiency and temporal mismatch. Without this thermal storage, the system would be stuck at the low round-trip efficiency (25-35%) typical of conventional hydrogen storage.

A multi-stage compression system with intercooling and expansion recovery achieves 92% isothermal efficiency through heat integration with the rSOC stacks. The compressed hydrogen feeds a hybrid storage system combining conventional pressure vessels with metal organic framework (MOF) modules that provide 3× volumetric density improvement.

The present invention provides an integrated thermal management system that captures high-grade heat during exothermic operational modes and stores it for use during endothermic operational modes. By temporally shifting thermal energy, the system achieves thermoneutral electrolysis without parasitic electrical heating, significantly improving round-trip efficiency compared to conventional systems.

The thermal integration network boosts efficiency to 52%, making the technology economically viable. It captures high-grade heat (750-850° C.) from the rSOC stacks during exothermic fuel cell operation and stores it in molten salt for use during endothermic electrolysis operation, improving electrolysis efficiency by 15-20%.

The heat system substitutes free waste heat for expensive electricity during the electrolysis (charging) phase. Splitting water (electrolysis) is an endothermic reaction; it absorbs massive amounts of energy. In conventional systems, this energy is supplied entirely by electricity, requiring about 3.2 Volts per cell. If a system keeps the cells hot (thermal energy) and supplies the necessary heat of reaction externally, the electrical requirement drops to 2.6 Volts per cell. By using stored heat instead of electricity to drive the reaction, the theoretical efficiency jumps from 77% to 95%. The heat storage system essentially allows the battery to "charge" using 15-20% less electricity. The system cannot simply pipe heat directly from the fuel cell to the electrolyzer because they never run at the same time. This system acts as a "time machine" for heat.

The system runs as a Fuel Cell when solar is off (night/evening). This process is highly exothermic, generating high-grade heat (750-850° C.). The system runs as an Electrolyzer when the sun is shining. This is when it needs the heat to achieve the efficiency gains.

The molten salt tanks capture the heat generated at night and hold it for 8-12 hours to be used during the day.

The rSOC stacks are made of ceramics (YSZ, LSCF) which are brittle and sensitive to temperature changes. Rapid changes in temperature can destroy the stacks. The transition from exothermic (heating up) to endothermic (cooling down) modes creates massive thermal stress. The thermal storage system acts as a buffer. By circulating the molten salt, the system can maintain the stacks at a uniform temperature ($\Delta T<10°$ C.) regardless of which mode is running. This eliminates the lag times of 10-30 minutes required for thermal stabilization in conventional systems.

Dynamic stack reconfiguration enables voltage matching between varying solar input and electrochemical requirements without power electronics losses, achieved through a novel switching matrix that reconnects cells in series/parallel configurations.

Terms and Definitions

- HHV: Higher heating value, a measure of thermal efficiency.
- LSCF: Lanthanum Strontium Cobalt Ferrite.
- LSTM: Long/short-term memory.
- MOF-5: Metal-Organic Framework-5, a porous crystalline material made from zinc. oxide clusters $Zn_4O$ and 1,4-benzenedicarboxylate (terephthalate) organic linkers.
- MPa: Megapascal, a measure of material strength.
- PEM: Proton Exchange Membrane, a type of membrane in a fuel cell.
- SOEC: Solid oxide electrolysis cell.
- SOFC: Solid oxide fuel cell.

BRIEF DESCRIPTION OF THE SEVERAL VIEWS OF THE DRAWINGS

To identify the discussion of any particular element or act easily, the most significant digit or digits in a reference number refer to the figure number in which that element is first introduced.

DETAILED DESCRIPTION

System Overview

Figure 1:
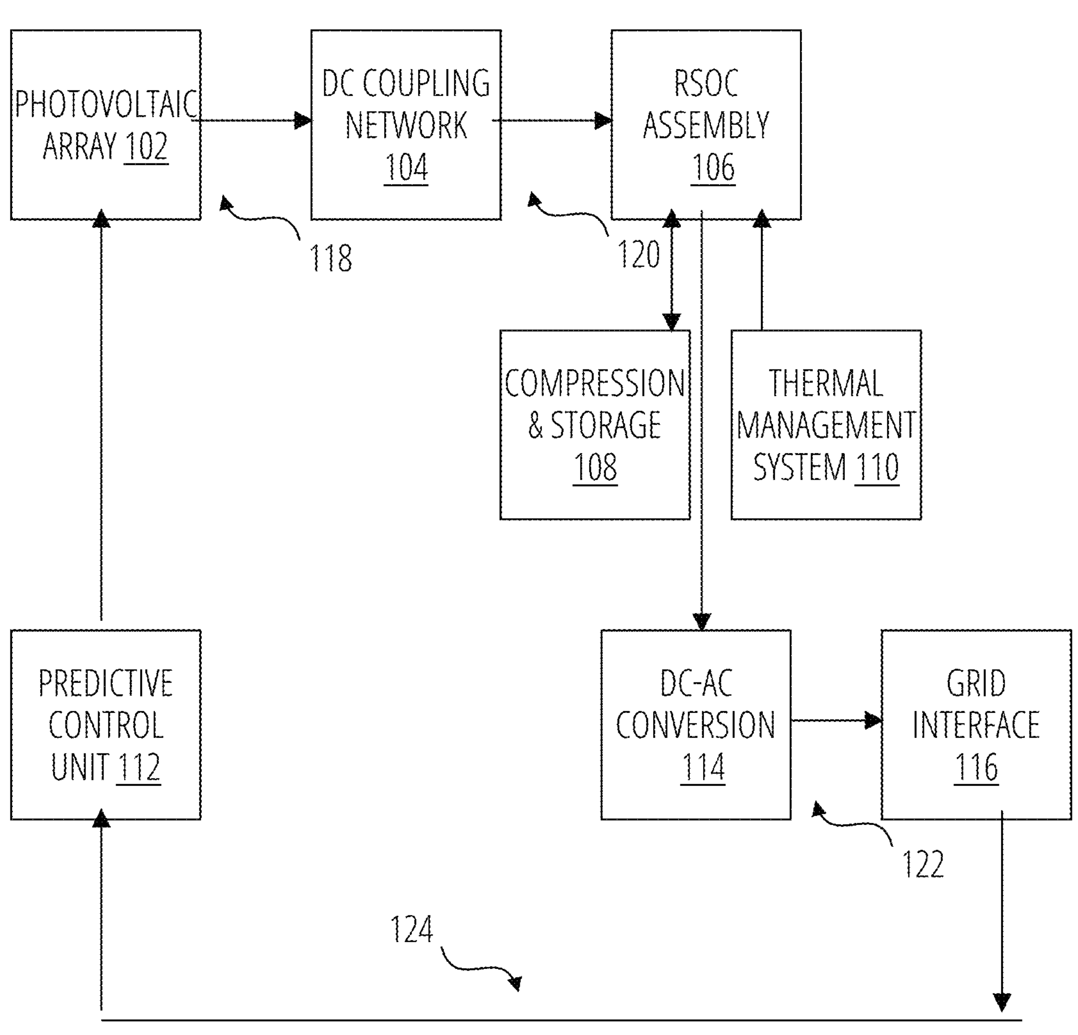
FIG. 1 is a schematic diagram of the complete adaptive multi-mode solar energy storage system according to an embodiment of the present invention.

Referring to FIG. 1, the adaptive multi-mode solar energy storage system comprises a photovoltaic array 102, a DC coupling network 104, an rSOC assembly 106, a compression & storage 108 system, a thermal management system 110, a predictive control unit 112, a DC-AC conversion 114, and a grid interface 116.

The photovoltaic array 102 comprises bifacial silicon heterojunction cells with peak efficiency of 26%, arranged in strings that can be dynamically reconfigured by the DC coupling network 104. Unlike conventional systems that use fixed MPPT (maximum power point tracking), the present invention employs predictive MPPT that anticipates cloud transients using sky-facing cameras and satellite data.

Reversible Solid Oxide Cell Assembly

Figures 2A, 2B:
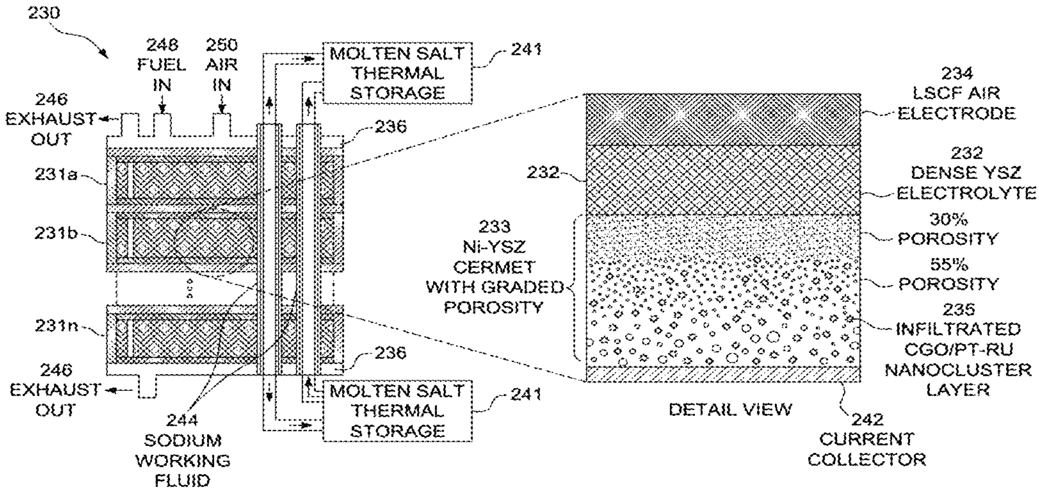
FIG. 2A illustrates the reversible solid oxide cell (rSOC) stack.
FIG. 2B depicts the details of one cell in the rSOC stack.

As shown in FIG. 2, the rSOC assembly 230 comprises a plurality of reversible solid oxide cell (rSOC) stacks 231*a*-23 In capable of operating alternately in electrolysis mode and fuel cell mode. Each cell comprises an ytttria-stabilized zirconia (YSZ) electrolyte 232, a nickel-YSZ cermet fuel electrode 233, and a lanthanum strontium cobalt ferrite (LSCF) air electrode 234. In one embodiment, the invention features graded porosity structure of the fuel electrode 233, varying from 30% at the electrolyte interface to 55% at the current collector, optimizing both modes of operation.

The cells incorporate a novel infiltrated catalyst layer 235 comprising cerium-gadolinium oxide (CGO) with dispersed platinum-ruthenium nanoclusters of 2-3 nm diameter that reduce activation overpotentials by 40% compared to conventional electrodes. This catalyst layer is predicted to be stable across 10,000+ cycles between electrolysis and fuel cell modes.

The system comprises a thermal integration network capturing and utilizing waste heat between system components. Each stack 231*a*-231*n* includes integrated heat pipes 236 containing sodium working fluid 244 that maintain uniform temperature distribution ($\Delta T<10°$ C.) across the stack. The heat pipes connect to a molten salt thermal storage system 241 that captures exothermic heat during fuel cell operation.

The reversible solid oxide cell assembly 230 operates through distinctly different electrochemical reaction pathways depending on the operational mode. During fuel cell (SOFC) mode, hydrogen enters through the fuel in 248 channel, and hydrogen oxidation occurs at the fuel electrode 233 according to the reaction: $H_2(g)+O^{2-}(YSZ)\rightarrow H_2O(g)+2e^-$, where hydrogen gas adsorbs onto the nickel catalyst surface, dissociates into atomic hydrogen, and reacts with oxygen ions transported through the YSZ electrolyte to form steam and release electrons. Simultaneously air enters at the air in 250 channel and encounters the air electrode 234, where oxygen reduction proceeds via: $\frac{1}{2}O_2(g)+2e^-\rightarrow O^{2-}$ (YSZ), where molecular oxygen adsorbs onto the LSCF perovskite surface, dissociates, accepts electrons from the external circuit, and incorporates into oxygen vacancies for transport through the electrolyte. The overall fuel cell reaction $H_2+\frac{1}{2}O_2\rightarrow H_2O$ releases 241.8 kJ/mol ($\Delta H°$) with a Gibbs free energy change of −228.6 kJ/mol at 850° C., converting approximately 65% of the chemical energy to electricity while releasing the remainder as high-grade heat captured by the thermal management system. The byproduct, water $H_2O$ in the form of steam exists through the exhaust out 246 channel.

During electrolysis (SOEC) mode, the reactions reverse with mechanistic differences that the present invention specifically addresses. At the fuel electrode 233, now functioning as a cathode, steam reduction occurs: $H_2O$ (g)$+2e^-\rightarrow H_2$ (g)$+O^{2-}$(YSZ), where steam molecules adsorb at the Ni/YSZ triple-phase boundaries, accept electrons from the external circuit, and dissociate into hydrogen gas and oxygen ions. The infiltrated CGO catalyst layer 235 with Pt-Ru nanoclusters enhances this reaction by providing additional active sites for $H_2O$ dissociation and reducing the activation overpotential from 0.35V to 0.21V. At the air electrode 234 functioning as an anode, oxygen evolution proceeds: $O^{2-}(YSZ) \rightarrow ½O_2(g)+2e^-$, where oxygen ions from the electrolyte lose electrons and recombine to form molecular oxygen. The endothermic nature of electrolysis ($\Delta H°=+241.8$ kJ/mol) requires heat input, which the present invention supplies from stored molten salt 502 at 850° C., enabling thermoneutral operation where electrical energy input equals only the Gibbs free energy requirement ($\Delta G°=188.6$ kJ/mol at 850° C.), achieving 89% efficiency versus 70% for conventional adiabatic electrolysis.

The graded porosity structure of the fuel electrode 233 influences reaction kinetics and mass transport in both operational modes. At the electrolyte interface where porosity is 30%, the high density of Ni/YSZ contact points creates an electrochemically active triple-phase boundary (TPB) length exceeding $10^{12}$ $m/m^3$, providing abundant reaction sites while maintaining structural integrity. The porosity gradient increasing to 55% toward the current collector ensures adequate diffusion pathways with calculated tortuosity factor $\tau=1.8$, enabling gas-phase diffusion coefficients of $D(H_2)=8.5\times10^{-5}$ $m^2/s$ and $D(H_2O)=6.2\times10^{-5}$ $m^2/s$ at operating temperature. This prevents concentration polarization where local $H_2$ depletion (fuel cell mode) or $H_2O$ depletion (electrolysis mode) would otherwise limit current density to <0.5 $A/cm^2$. The present invention achieves 2.0 $A/cm^2$ in electrolysis mode without mass transport limitations.

The electrolyte layer comprises yttria-stabilized zirconia (YSZ). The oxygen ion transport mechanism through the YSZ electrolyte 232 follows vacancy-mediated conduction described by the Kröger-Vink notation: $Y_2O_3 \rightarrow 2Y'(Zr)+V(O)\cdot\cdot+3O(O)\times$, where yttrium substitution creates oxygen vacancies ($V(O)\cdot\cdot$) that enable $O^{2-}$ migration. The activation energy for oxygen ion hopping between adjacent sites is 0.85 eV, resulting in ionic conductivity $\sigma=\sigma_o \exp(-Ea/kT)=0.11$ S/cm at 850° C. The electric field across the 15 μm thick electrolyte (typically 0.7-1.2 V) drives directional oxygen ion migration at a flux of $J(O^{2-})=(\sigma/F)\nabla\mu(O^{2-})$, where the electrochemical potential gradient $\nabla\mu(O^{2-})$ determines transport direction: from air electrode to fuel electrode during fuel cell operation, reversed during electrolysis. This bidirectional ion transport capability with identical conductivity in both directions enables the reversible operation central to the present invention.

The LSCF air electrode 234 composition $La_{0.6}Sr_{0.4}Co_{0.2}Fe_{0.8}O_{3}-\delta$ provides mixed ionic-electronic conductivity (MIEC) needed for distributed oxygen exchange reactions. Unlike purely electronic conductors that limit reactions to TPB lines, the MIEC nature extends the reaction zone throughout the electrode bulk, achieving an effective surface area of $10^5$ $m^2/m^3$. During fuel cell mode, oxygen reduction proceeds through a multi-step surface exchange mechanism: $O_2(gas) \rightarrow O_2(ads) \rightarrow 2O(ads) \rightarrow 2O(lattice) \rightarrow 2O^{2-}(YSZ)$, with the rate-limiting surface exchange coefficient $k^*=10^{-5}$ cm/s at 850° C. The Sr doping level of 40% optimizes the concentration of oxygen vacancies ($\delta\approx0.15$) while maintaining phase stability; higher Sr content would increase conductivity but causes decomposition into separate phases. During electrolysis, the oxygen evolution reaction reverses this pathway, with the Co content catalyzing O—O bond formation while Fe provides structural stability and prevents Co reduction under polarization.

The reversible operation introduces unique degradation mechanisms that the material selection specifically mitigates. During mode transitions, the fuel electrode experiences alternating reducing (fuel cell) and oxidizing (electrolysis) conditions that would cause "redox cycling" degradation in conventional materials. Pure nickel electrodes undergo volume changes of ±24% during Ni/NiO transitions, causing delamination within 10-20 cycles. The Ni-YSZ cermet prevents nickel oxidation by maintaining the Ni phase below its oxidation potential through the electronic conductivity network even at open circuit. The oxygen partial pressure at the fuel electrode remains below $10^{-20}$ atm during normal operation, well below the Ni/NiO equilibrium of $10^{-14}$ atm at 850° C. Additionally, the infiltrated CGO layer 235 serves as an oxygen buffer, absorbing excess oxygen during transients through $Ce^{4+}/Ce^{3+}$ redox reactions, protecting the nickel phase while maintaining catalytic activity through its own mixed conductivity of 0.1 S/cm, ensuring stable operation across 10,000+ reversible cycles.

The yttria-stabilized zirconia (YSZ) electrolyte 232 functions as a membrane—a selective oxygen ion ($O^{2-}$) conductor while maintaining complete electronic insulation, a critical requirement for electrochemical cell operation. At the operating temperature of 750-850° C., the 8-10 mol % yttrium oxide ($Y_2O_3$) dopant in the zirconia ($ZrO_2$) host lattice creates oxygen vacancies through charge compensation: when $Y^{3+}$ substitutes for $Zr^{4+}$, oxygen vacancies form to maintain electrical neutrality. These vacancies enable $O^{2-}$ ion mobility through a hopping mechanism, where oxygen ions move from occupied sites to adjacent vacant sites with an activation energy of approximately 0.8-1.0 eV. The ionic conductivity reaches 0.1 S/cm at 850° C. while electronic conductivity remains below $10^{-8}$ S/cm, providing an ionic transference number exceeding 0.9999. This near-perfect ionic selectivity forces electrons to travel through the external circuit, generating electrical work during fuel cell operation or consuming electrical energy during electrolysis.

The selection of YSZ over alternative electrolyte materials, including proton-conducting ceramics such as barium cerate/zirconate (BCY/BZY) or oxygen-conducting materials like gadolinia-doped ceria (GDC), is driven by multiple technical advantages specific to reversible operation. While proton-conducting ceramics operate at lower temperatures (400-600° C.), they suffer from chemical instability in $CO_2$ and $H_2O$ atmospheres, forming carbonates and hydroxides that degrade conductivity by >50% within 1000 hours. YSZ maintains complete phase stability across the entire operational envelope, showing no measurable degradation after 40,000 hours. Additionally, YSZ's thermal expansion coefficient ($10.5\times10^{-6}$ $K^{-1}$) closely matches the Ni-YSZ cermet electrodes ($12.5\times10^{-6}$ $K^{-1}$), preventing delamination during thermal cycling between electrolysis and fuel cell modes. While GDC offers higher ionic conductivity (0.15 S/cm at 750° C.), it becomes electronically conductive under reducing conditions (fuel electrode side), causing internal short-circuiting that reduces efficiency by 10-15%. The YSZ membrane thickness of 10-15 μm, achieved through tape casting and co-sintering, provides sufficient mechanical strength (>300 MPa flexural strength) to support the cell structure while minimizing ohmic resistance to <0.15 $\Omega\cdot cm^2$.

The selection of yttria-stabilized zirconia (YSZ) electrolyte over conventional proton exchange membranes with platinum nanoparticle catalysts on porous carbon supports represents a fundamental design choice driven by the reversible operation requirements. While platinum on carbon electrodes achieve high performance in low-temperature (60-80° C.) fuel cells, they suffer from several insurmountable limitations for reversible solid oxide operation. At the 750-850° C. operating temperature of the present invention, carbon supports would immediately oxidize to $CO_2$, destroying the electrode structure. Furthermore, platinum nanoparticles undergo severe sintering above 500° C., with particle size increasing from 2-3 nm to >50 nm within hours, resulting in >90% loss of active surface area.

The nickel-YSZ cermet fuel electrode 233 provides unique advantages for reversible operation that platinum-based catalysts cannot match. During fuel cell mode, the nickel phase provides electronic conductivity and catalytic activity for hydrogen oxidation, while the YSZ phase provides ionic conductivity and structural stability. Critically, during electrolysis mode, the same nickel phase catalyzes water reduction without the carbon corrosion that occurs in PEM electrolyzers above 1.5V. The cermet structure maintains a triple-phase boundary length of $>10^4$ $m/m^3$ throughout 10,000+ cycles, whereas platinum on carbon electrodes lose >30% of their electrochemically active surface area after only 1,000 cycles in reversible operation due to carbon corrosion during electrolysis.

The graded porosity structure from 30% to 55% in the fuel electrode 233 addresses mass transport limitations that cannot be resolved with platinum-carbon architectures. In conventional platinum-carbon electrodes, the carbon support requires 30-40% Nafion ionomer loading to create ionic pathways, which blocks gas diffusion pores and creates flooding issues during water electrolysis. The present invention's graded porosity eliminates this trade-off: the 30% porosity near the electrolyte interface maximizes triple-phase boundary density for reaction sites, while the increasing porosity toward the current collector ensures adequate gas diffusion for both $H_2O$ delivery (electrolysis) and $H_2$ removal (fuel cell) without ionomer-induced transport limitations.

The infiltrated catalyst layer comprising cerium-gadolinium oxide (CGO) with dispersed platinum-ruthenium nanoclusters represents a departure from conventional bulk platinum loadings. Traditional PEM fuel cells require 0.4-0.8 $mg/cm^2$ of platinum, costing >$50/kW in catalyst alone. The present invention uses <0.01 $mg/cm^2$ of platinum-ruthenium only as a surface promoter on the CGO mixed ionic-electronic conductor. The CGO provides the primary catalytic activity through its oxygen storage capacity and mixed conductivity, while the Pt-Ru nanoclusters lower activation barriers at specific sites. This configuration maintains performance while reducing precious metal content by >95% compared to PEM systems.

The thermal stability advantages of the ceramic-based rSOC over platinum-carbon systems enable the thermal integration of the present invention. Operating at 750-850° C., the rSOC assembly can directly utilize high-grade heat from exothermic fuel cell operation for endothermic electrolysis, improving efficiency by 15-20%. Platinum-carbon systems operating below 100° C. cannot meaningfully store or utilize thermal energy due to the small temperature differential with ambient conditions. The ceramic materials exhibit thermal expansion coefficients matched within $0.5\times10^{-6}$/K, preventing delamination during thermal cycling, whereas platinum-carbon-Nafion assemblies experience irreversible degradation from differential expansion during repeated wet-dry cycles.

The LSCF air electrode 234 provides advantages over platinum-based oxygen electrodes that are particularly important for reversible operation. During electrolysis, oxygen evolution at high current densities (>2 $A/cm^2$) rapidly degrades platinum catalysts through oxide formation and dissolution. LSCF maintains stable performance through a bulk oxidation-reduction mechanism rather than surface catalysis, with the perovskite structure accommodating oxygen vacancies without structural degradation. The material's electronic conductivity of >100 S/cm at operating temperature eliminates the need for carbon supports entirely, removing the primary degradation mechanism of conventional electrodes.

The atomic-level structure of the interfaces demonstrates why ceramic materials enable superior reversible operation. The YSZ/Ni interface maintains coherent grain boundaries with continuous ion conduction paths, whereas platinum nanoparticles create isolated reaction sites requiring ionomer bridges. The CGO infiltration forms a conformal coating that preserves the underlying cermet structure while providing additional catalytic sites. In contrast, conventional platinum redeposition during cycling leads to agglomeration and loss of active area.

The system achieves round-trip efficiency exceeding 50% through coordinated operation of its components.

Multi-Stage Compression System

Figure 3:
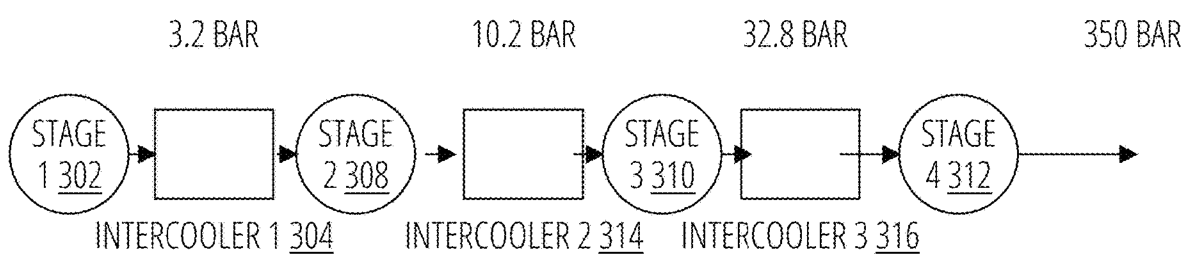
FIG. 3 shows the multi-stage compression system with intercooling and energy recovery turbines.
Figure 3:

As illustrated in FIG. 3, the compression system employs a novel four-stage compression train with intercooling between stages. Each compressor stage achieves a pressure ratio of 4.3:1, resulting in final storage pressure of 350 bar while maintaining near-isothermal compression efficiency (n=1.05).

The compression system comprises four stages: a stage 1 302, a stage 2 308, a stage 3 310, a stage 4 312, intercoolers—an intercooler 1 304, an intercooler 2 314, and an intercooler 3 316 between each pair of stages, and an expansion turbine 306, Intercoolers 1-3, 304-316, are integrated with the rSOC thermal management system, preheating inlet air for the air electrodes during fuel cell operation. The fourth compression stage 254 uniquely incorporates magnetic bearings and operates at 120,000 RPM, achieving the final pressure boost, while eliminating lubrication contamination of the hydrogen stream.

The expansion turbine 306 recovers energy during hydrogen discharge, achieving 78% isentropic efficiency through a novel variable inlet guide vane system that maintains optimal incidence angles across varying flow rates.

Hybrid Storage System

Figure 4:
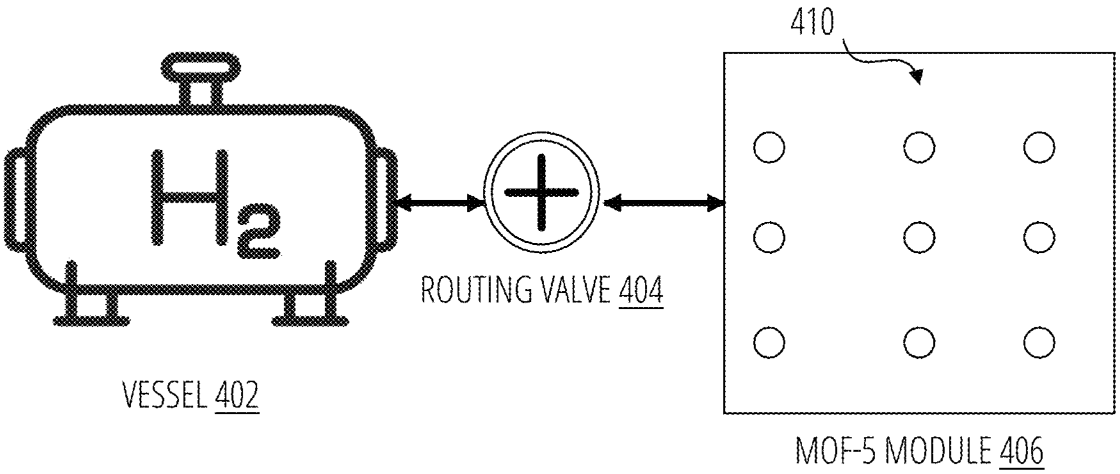
FIG. 4 depicts the hybrid storage subsystem combining high-pressure tanks and metal organic framework (MOF) modules.

FIG. 4 details the hybrid storage system combining conventional Type IV pressure vessels 402 with metal organic framework MOF-5 modules 406 connected by a routing valve 404. The MOF modules contain pelletized MOF-5 modified with platinum (pt) nanoclusters that enhance hydrogen uptake kinetics by 300%.

The storage system stores produced hydrogen in a hybrid system of pressure vessels and metal organic frameworks The system intelligently routes hydrogen between storage modes based on demand predictions for discharge requirements. High-pressure tanks 402 serve rapid discharge needs while MOF-5 modules 406 provide dense storage for seasonal applications.

The MOF-5 modules 406 operate at ambient temperature and 35 bar, storing 6.5 wt % hydrogen.

The storage system achieves volumetric storage density three-four times greater than conventional pressure vessels alone.

Thermal Integration Network

Figure 5:
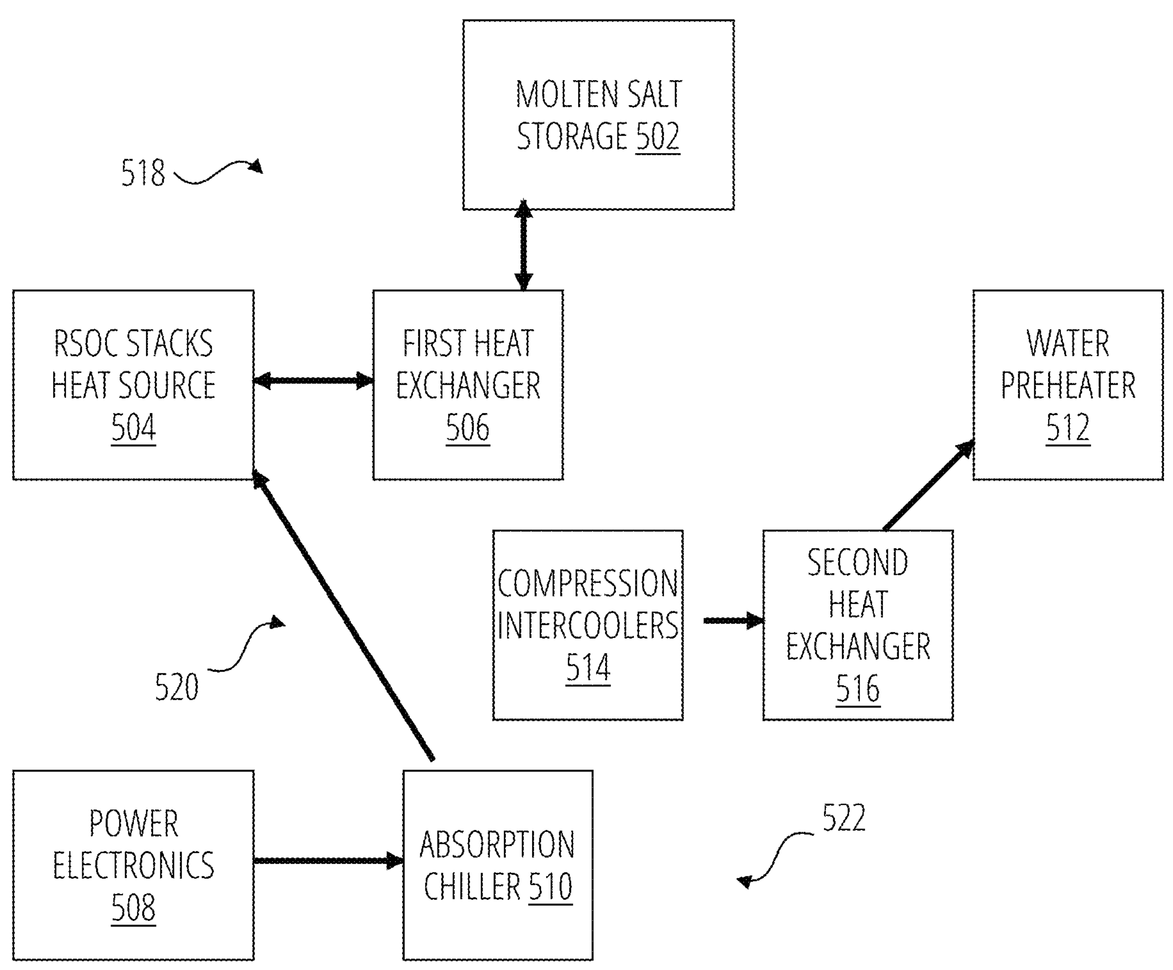
FIG. 5 is a detailed view of the thermal integration network showing heat exchange pathways between components.

A thermal management system, FIG. 5, using phase change materials (PCM) maintains isothermal conditions during the exothermic absorption and endothermic desorption processes. FIG. 5 depicts the comprehensive thermal integration network. To address the thermal mismatch described in the Background section, the molten salt storage 502 captures the night-time heat. By retaining this thermal energy for 8-12 hours, the system enables the rSOC to operate at 850° C. during the day without parasitic electrical heating, raising efficiency to 52%.

The system comprises a molten salt storage 502, a rSOC stacks heat source 504, a first heat exchanger 506, power electronics 508, an absorption chiller 510, a water preheater 512, compression intercoolers 514, and a second heat exchanger 516.

The high-grade heat loop 518 manages the central interaction: utilizing the intense heat generated by the fuel cells to drive the efficiency of the electrolyzers later.

The network recovers and stores waste heat during exothermic fuel cell operation. When the Reversible Solid Oxide Cell (rSOC) stacks 504 operate in fuel cell mode (typically at night), the reaction is highly exothermic, generating high-grade heat at approximately 850° C. This heat is stored in a ternary chloride eutectic mixture. Instead of venting this heat, the system transfers it to molten salt storage 502. A ternary chloride eutectic mixture (e.g., NaCl—KCl—$MgCl_2$), unlike standard solar salts, remains stable up to 900° C. The salt tanks hold this thermal energy for 8-12 hours, effectively bridging the gap between night-time generation and day-time charging.

When solar power becomes available, the system switches to electrolysis mode. This reaction is endothermic (heat-absorbing). The stored molten salt 502 circulates back through corrosion-resistant first heat exchanger 506 to heat the rSOC stacks 504. This stored heat is supplied to the rSOC, providing the entropic contribution ($T\Delta S$) required for the reaction. By supplying this stored heat, the rSOC stacks do not require parasitic electrical heating. This allows the electrolysis process to proceed at a voltage of 2.6 V per cell rather than the 3.2 V required by cold electrolysis, boosting electrolysis efficiency by 15-20%.

The medium grade heat cascade 520 loop for compression and water preheating recovers moderate heat produced during hydrogen compression to prepare water for the electrolysis process. The compression intercoolers 514 generate medium-grade heat (200-400° C.) as they cool the hydrogen gas between compression stages. This heat is routed to a cascade of second heat exchangers 516. These exchangers transfer the heat to the process water supply in the water preheater 512, preheating it before it enters the rSOC stacks for electrolysis. This reduces the energy load required to bring the water up to steam temperature.

The low-grade heat recovery 522 loop for electronics and chilling scavenges the remaining low-temperature waste heat for auxiliary cooling functions. The power electronics 508 systems generate low-grade heat (<100° C.). This heat is directed to an absorption chiller 510. The chiller uses this heat energy to produce cooling, which is then sent to the MOF (Metal Organic Framework) Modules. This cooling supports the MOF storage units, which require thermal management to maintain isothermal conditions during hydrogen absorption.

An absorption chiller works by using heat energy to drive a chemical process rather than using a mechanical compressor like a standard refrigerator. Inside the chiller, a refrigerant water, in one embodiment, evaporates in a low-pressure chamber. This evaporation absorbs heat from the water loop to be cooled, in this case, the loop going to the MOF modules. The refrigerant vapor is absorbed by a chemical solution (the "absorbent," Lithium Bromide or Ammonia, in one embodiment). This pulls the vapor out of the evaporator, maintaining the low pressure needed for cooling. The "waste heat" from the power electronics is applied to this solution in a generator. The heat boils the refrigerant out of the absorbent, separating them so the cycle can start over. By using this cycle, the system turns the "waste" heat from one part of the machine (electronics) into useful cooling for another part (storage), increasing overall efficiency.

High-temperature heat (850° C.) from fuel cell operation is stored in a two-tank molten salt system using a high-temperature ternary chloride eutectic mixture (e.g., NaCl—KCl—$MgCl_2$ or NaCl—KCl-$ZnCl_2$) maintained under an inert atmosphere. Unlike nitrate-based solar salts which decompose above 600° C., this chloride-based medium remains stable up to 900° C., allowing for direct thermal coupling with the rSOC stack. During electrolysis, this stored heat is delivered through corrosion-resistant first heat exchangers 506 (e.g., Hastelloy-N or ceramic-lined) to maintain optimal rSOC temperature without electrical heating.

Medium-temperature heat (200-400° C.) from compression intercoolers 514 preheats process water for electrolysis through a cascade of second heat exchangers 516. Low-temperature heat (<100° C.) from power electronics 508 cooling provides facility heating or drives an absorption chiller 510 for MOF temperature control.

Temperature variation across each cell is maintained below 10° C. by the heat pipes 236. The thermal network achieves 89% heat recovery efficiency, improving overall system round-trip efficiency from 38% (conventional) to 52% (present invention).

Predictive Control System

Figure 6:
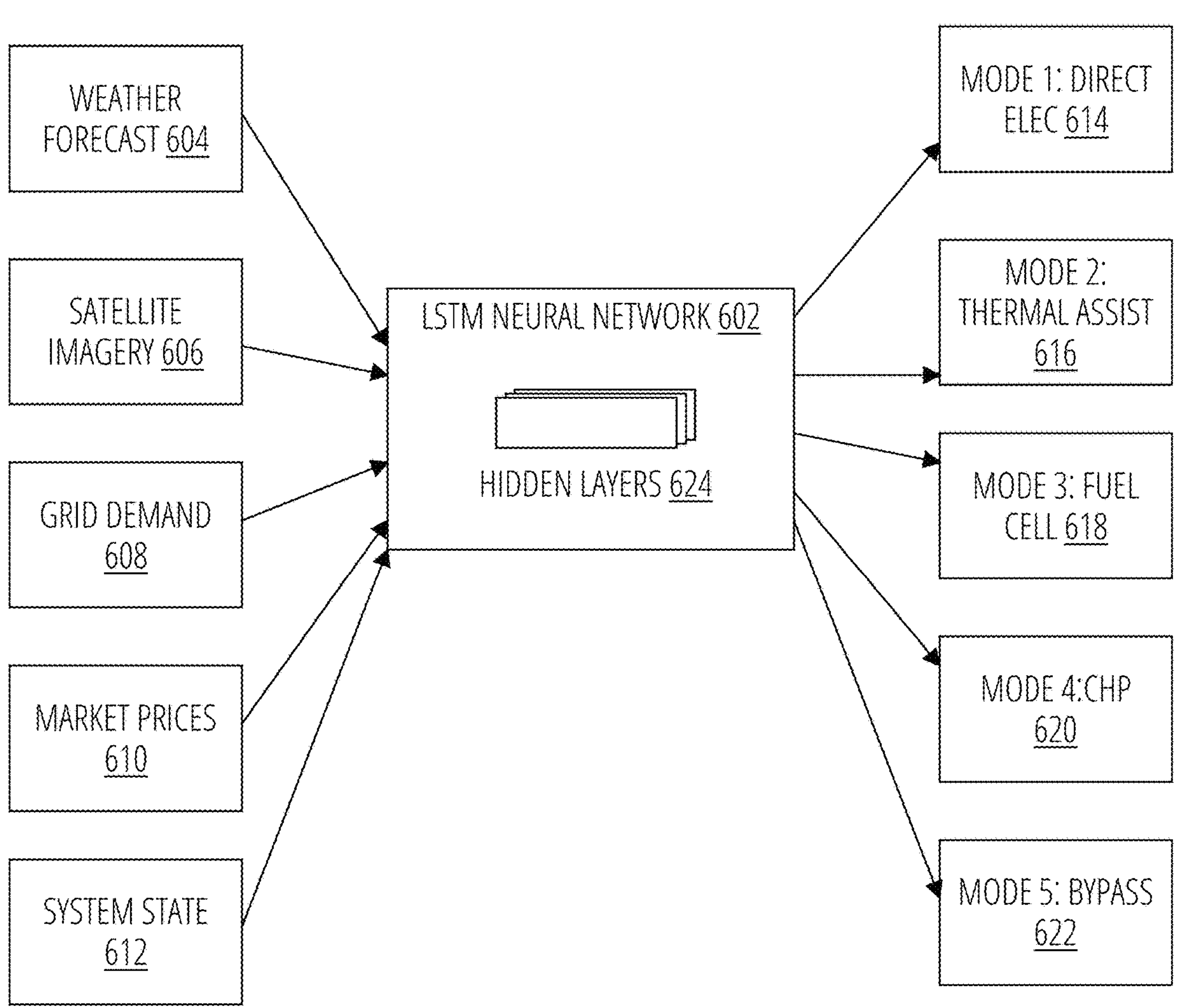
FIG. 6 illustrates the predictive control system architecture with neural network modules and data flows.

FIG. 6 illustrates the predictive control system architecture. A long/short-term memory (LSTM) neural network 602 processes multiple data streams: weather forecasts 604, satellite imagery 606, grid demand 608, market prices 610, and system state 612.

The system comprises an LSTM neural network 602, a weather forecast 604, satellite imagery 606, grid demand 608, market prices 610, system state 612, a mode 1: direct elec 614, a mode 2: thermal assist 616, a mode 3: fuel cell 618, a mode 4: combined heat and power (CHP) 620, a mode 5: bypass 622, and hidden layers 624. Data acquisition modules acquire data for weather, grid demand, and market prices The LSTM neural network 602 is trained on 5 years of historical data and continuously updates using reinforcement learning with a reward function that balances efficiency, revenue, and component longevity. The reinforcement learning module provides continuous model updating. The system predicts optimal operating modes 72 hours in advance with 94% accuracy.

Dynamic Stack Reconfiguration

Figure 7:
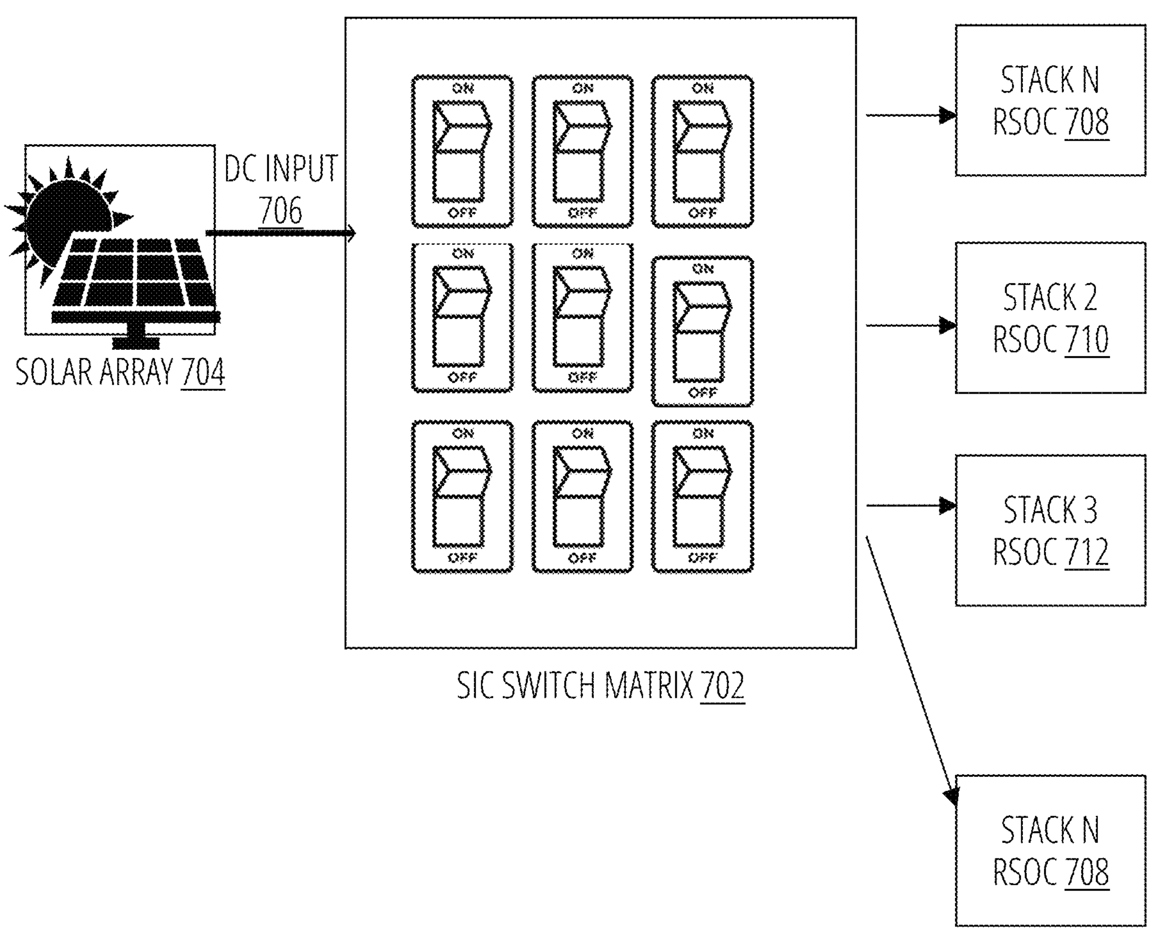
FIG. 7 shows the power electronics configuration enabling dynamic reconfiguration of rSOC stacks.

Referring to FIG. 7, the power electronics configuration dynamically reconfigures reversible solid oxide cell stacks between series and parallel connections to match solar input voltage. It enables dynamic reconfiguration of the rSOC stacks without power conversion losses. A matrix of silicon carbide (SiC) switches 702 operating at 10 kHz can reconnect stacks from series to parallel configurations in <100 microseconds, matching the varying voltage of the solar array to the optimal operating voltage of the cells.

The system comprises a silicon carbide (SIC) switch matrix 702, a solar array 704, a DC input 706, a stack n rSOC 708, a stack 2 rSOC 710, and a stack 3 rSOC 712.

In high solar irradiance conditions, the solar cells generate high levels of current. The stacks are connected in parallel for high current electrolysis. During cloud transients or low light, the solar cells generate lowers levels of current, and the stacks automatically reconfigure to series connection, maintaining operation without drawing grid power. Dynamic reconfiguration occurs without power electronics conversion losses. This eliminates the 3-5% losses associated with DC-DC converters in conventional systems.

Operational Modes

Figure 8:
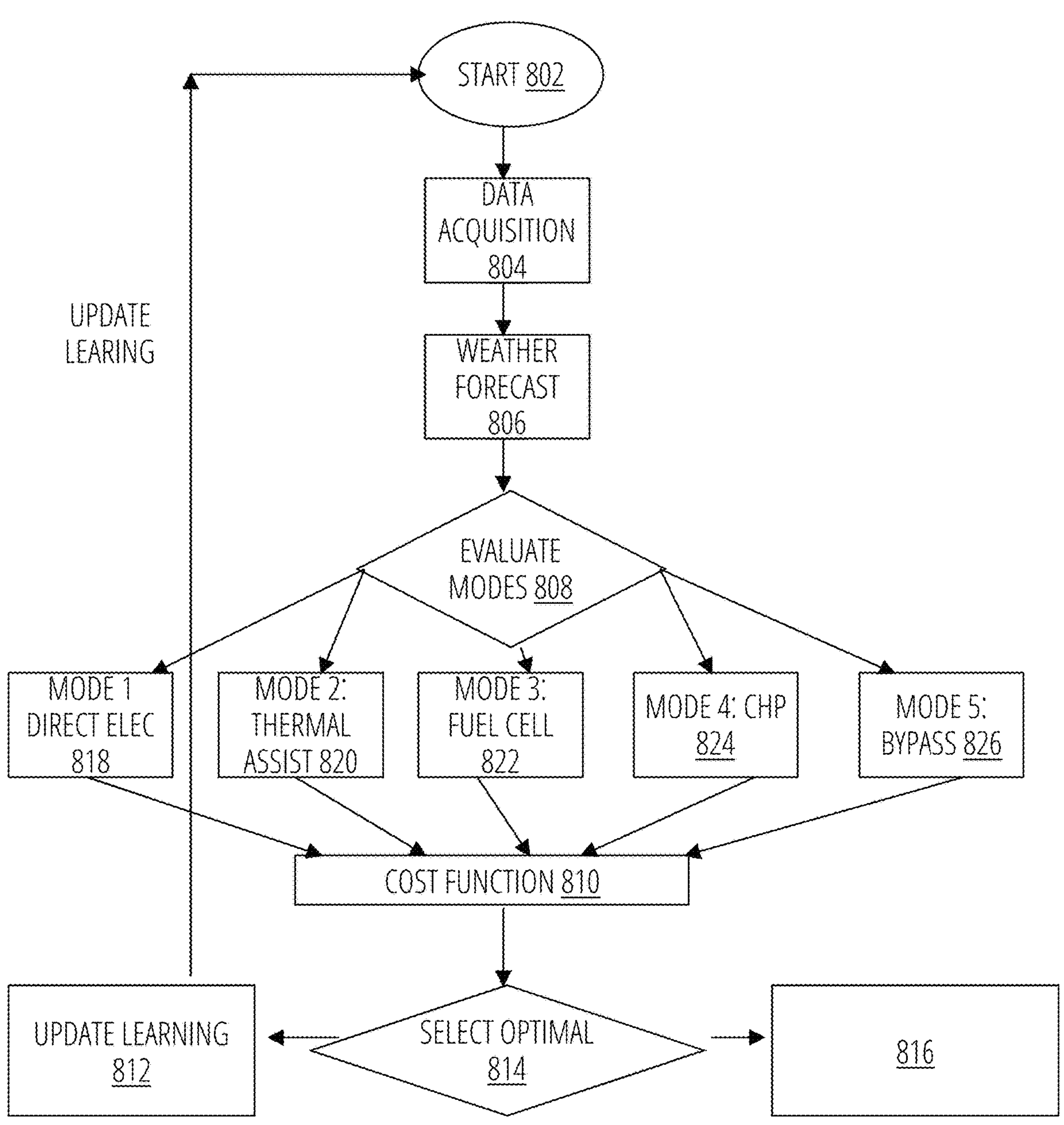
FIG. 8 is a flow chart of the predictive optimization algorithm for mode selection.

As shown in FIG. 8, the control algorithm 800 evaluates five operational modes:

- Mode 1—Direct electrolysis 818: Solar DC directly to rSOC in SOEC mode.
- Mode 2—Thermally-Assisted Electrolysis (820): Uses stored molten salt heat.
- Mode 3—Fuel Cell Generation (822): rSOC in SOFC mode to grid.
- Mode 4—Combined Heat and Power (824): Fuel cell with heat export.
- Mode 5—Bypass Storage (826): Direct solar to grid with battery buffer.

The algorithm evaluates each mode using a cost function incorporating predicted efficiency, market revenue, degradation cost, and grid stability value. Mode transitions are optimized to minimize thermal cycling stress on the rSOC stacks.

FIG. 8 illustrates a method of use, comprising: a start 802 step, a data acquisition 804 step comprising a weather forecast 806 acquisition step, cost function 810 computation, and evaluate modes 808 step, select optimal 814 mode step, selecting among the plurality of modes, followed by an execute mode 816 and an update learning 812 step.

The algorithm evaluates each mode using a cost function incorporating predicted efficiency, market revenue, degradation cost, and grid stability value. Mode transitions are optimized to minimize thermal cycling stress on the rSOC stacks.

Although FIG. 8 depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

Modular Expansion

Figure 9:
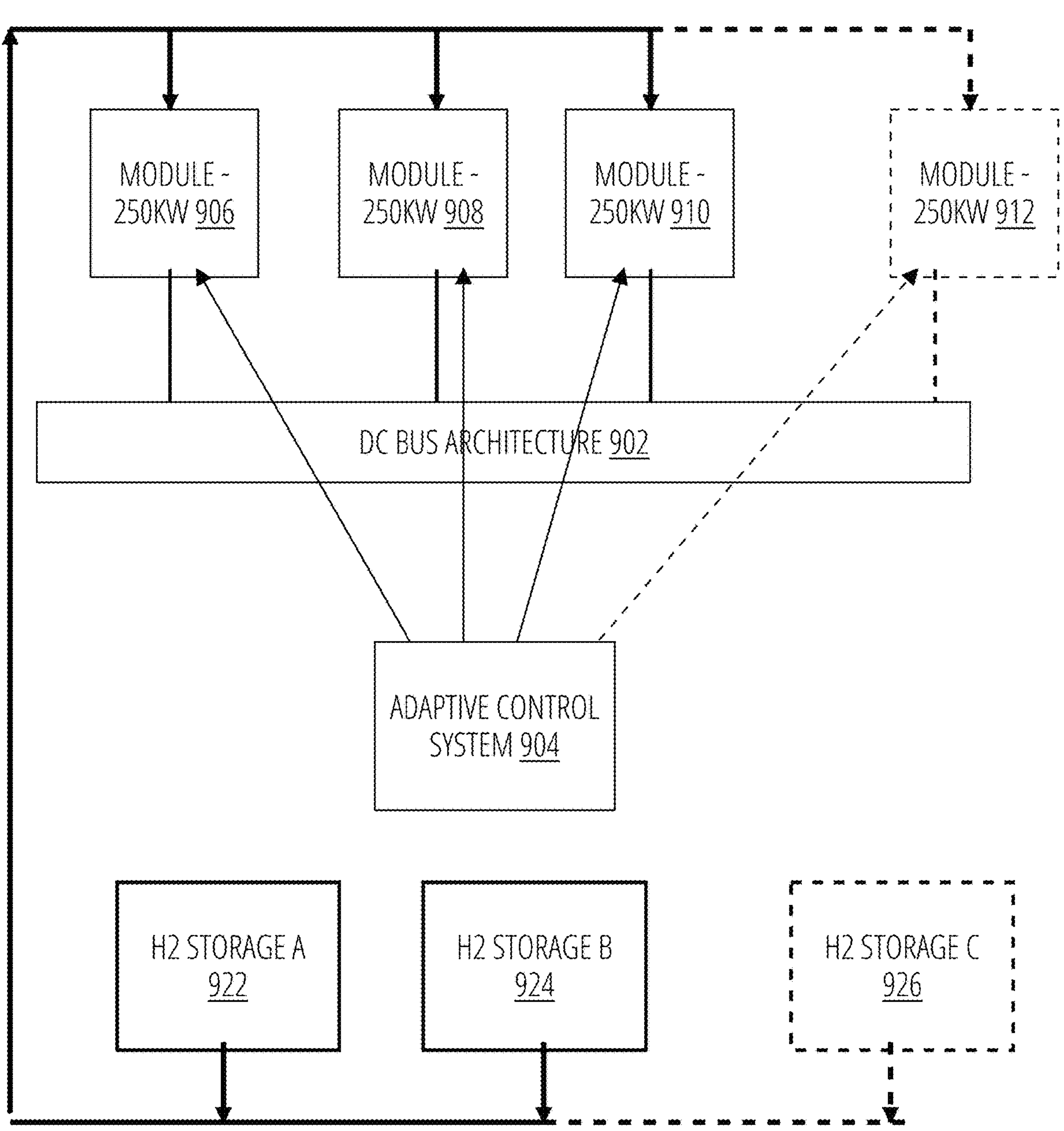
FIG. 9 illustrates the modular expansion capability of the system.

As illustrated in FIG. 9, the system architecture supports modular expansion through standardized 250 kW rSOC modules 906-912 that connect via a DC bus architecture 902. The predictive adaptive control system 904 automatically incorporates new modules and retrains its neural networks to optimize the expanded system. Expansion may also comprise adding one or more H2 storage C 926 to initial H2 storage A 922 and H2 storage B 924.

Water Management Subsystem

An integrated water management system 900 (not shown) captures product water from fuel cell operation in a zeolite adsorption system operating at $10^{-3}$ mbar. The captured water is purified through a reverse osmosis system powered by pressure recovery from the hydrogen expansion turbine, achieving >18 MΩ·cm resistivity required for electrolysis.

Performance Predictions

The system is predicted to achieve:

Round-trip efficiency: 52% (electricity-to-electricity)

Electrolysis efficiency: 89% (HHV) with thermal assist

Fuel cell efficiency: 65% electrical, 85% combined heat and power

Response time: <2 seconds for mode transitions

Degradation rate: <0.5%/1000 hours

Economic modeling shows levelized cost of storage (LCOS) of $0.08/kWh for daily cycling and $0.04/kWh for seasonal storage, compared to $0.15/kWh and $0.50/kWh respectively for conventional hydrogen systems.

I claim:

1. An adaptive multi-mode solar energy storage system comprising:

a photovoltaic array;

a plurality of reversible solid oxide cell (rSOC) stacks capable of operating alternately in electrolysis mode and fuel cell mode;

wherein each of said rSOC stacks comprises a plurality of cells, each comprising a fuel electrode, a cathode, an electrolyte, a catalyst, and a current collector;

wherein each of said electrodes comprises an electrolyte interface and a current collector interface;

a predictive control system employing machine learning algorithms to forecast energy patterns and select optimal operational modes;

a multi-stage compression system with intercooling and energy recovery;

a hybrid storage system combining pressure vessels and metal organic framework modules;

a thermal integration network capturing and utilizing waste heat between said adaptive multi-mode solar energy storage system components;

wherein the photovoltaic array is electrically coupled to the plurality of rSOC stacks to provide energy for the electrolysis mode;

wherein the multi-stage compression system is in fluid communication with the rSOC stacks to compress hydrogen generated during the electrolysis mode;

wherein the hybrid storage system is coupled to the multi-stage compression system to receive and store the compressed hydrogen; and a DC coupling and control network operatively interconnecting said photovoltaic array, rSOC stacks, multi-stage compression system, hybrid storage system, thermal integration network, and predictive control system such that said predictive control system coordinates operation of said photovoltaic array, stacks, systems, and network in multiple distinct operating modes;

wherein said adaptive multi-mode solar energy storage system achieves round-trip efficiency exceeding 50% through coordinated operation of said array, stacks, systems, and network.

2. The adaptive multi-mode solar energy storage system of claim 1, wherein said rSOC stacks comprise cells with graded porosity fuel electrodes varying from 30% porosity at the electrolyte interface to 55% porosity at the current collector.

3. The adaptive multi-mode solar energy storage system of claim 2, wherein said fuel electrodes further comprise an infiltrated catalyst layer of cerium-gadolinium oxide with dispersed platinum-ruthenium nanoclusters of between 2 and 3 nm diameter.

4. The adaptive multi-mode solar energy storage system of claim 1, wherein said predictive control system comprises a long/short-term memory neural network processing weather forecasts, satellite imagery, grid demand, and market prices to predict optimal operating modes 72 hours in advance.

5. The adaptive multi-mode solar energy storage system of claim 4, wherein said predictive control system selects among five operational modes:

a direct electrolysis mode;

a thermally-assisted electrolysis mode;

a fuel cell generation mode;

a combined heat and power mode; and a bypass storage mode.

6. The adaptive multi-mode solar energy storage system of claim 1, further comprising a dynamic stack reconfiguration system with a matrix of silicon carbide switches enabling series-parallel reconnection of rSOC stacks in less than 100 microseconds.

7. The adaptive multi-mode solar energy storage system of claim 1, wherein said multi-stage compression system comprises four stages achieving 350 bar final pressure with near-isothermal compression efficiency where the polytropic exponent, n, is less than 1.05.

8. The multi-stage compression system of claim 7, wherein a fourth stage of said four stages incorporates magnetic bearings capable of operating at 120,000 RPM.

9. The adaptive multi-mode solar energy storage system of claim 1, wherein said hybrid storage system comprises metal organic framework modules containing MOF-5 modified with platinum nanoclusters, achieving 6.5 wt % hydrogen storage at 35 bar and ambient temperature.

10. The adaptive multi-mode solar energy storage system of claim 1, wherein said thermal integration network comprises:

a molten salt thermal storage system operating at 850° C.;

cascade heat exchangers recovering heat generated by said multi-stage compression system; and an absorption chiller powered by low-grade waste heat; and wherein said network achieves greater than 85% heat recovery efficiency.

11. A method for operating an adaptive solar energy storage system comprising:

generating a forecast of energy demand, weather patterns, and market conditions using one or more machine learning algorithms;

selecting an optimal operational mode from multiple available modes based on said forecasting;

dynamically reconfiguring reversible solid oxide cell stacks between series and parallel connections to match solar input voltage, wherein each stack comprises a plurality of cells;

operating said cells in electrolysis mode during excess solar generation to generate hydrogen;

storing the hydrogen produced by said electrolysis mode in a hybrid system of pressure vessels and metal organic frameworks;

operating said cells in fuel cell mode during energy demand;

recovering and storing waste heat during exothermic fuel cell operation; and utilizing stored heat during endothermic electrolysis operation.

12. The method of claim 11, wherein said dynamically reconfiguring further comprises continuously retraining said machine learning algorithms using reinforcement learning with a reward function balancing efficiency, revenue, and component longevity.

13. The method of claim 11, wherein said reconfiguration occurs dynamically without power electronics conversion losses.

14. The method of claim 11, further comprising routing hydrogen between storage modes based on predicted discharge requirements.

* * * * *